Oct. 13, 1970  R. O'LEARY  3,534,318
GROUNDED ELECTRICAL RECEPTACLE
Filed Aug. 2, 1966
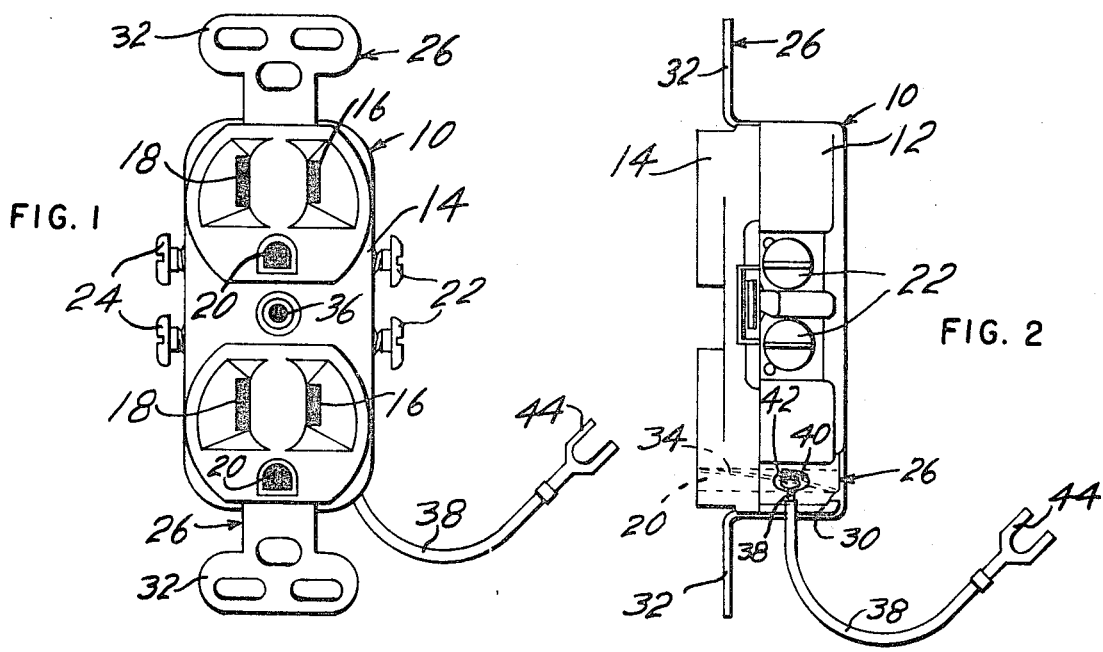
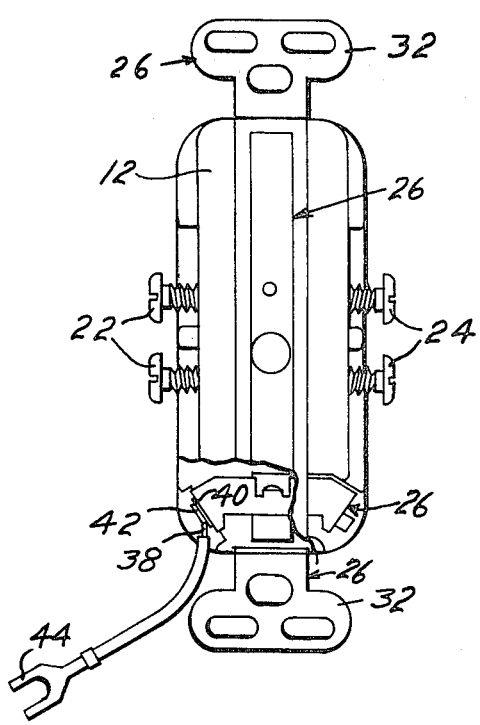
FIG. 4
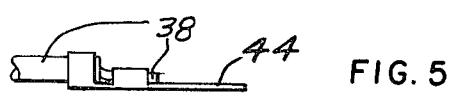
FIG. 5
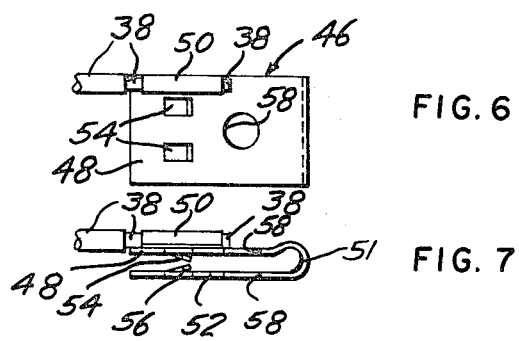
INVENTOR
Ray O'Leary
BY
TW Secrest
ATTORNEY

United States Patent Office 3,534,318
Patented Oct. 13, 1970

3,534,318
GROUNDED ELECTRICAL RECEPTACLE
Ray O'Leary, 1114 NE. Perkins Way,
Seattle, Wash. 98155
Filed Aug. 2, 1966, Ser. No. 569,654
Int. Cl. H01r 33/88
U.S. Cl. 339—14                                                        1 Claim

ABSTRACT OF THE DISCLOSURE

This invention is for a grounded electrical receptacle which provides means for grounding the receptacle to an outlet box and in case there is an electrical fault the electrical energy will be carried harmlessly to the outlet box and then to ground.

---

With the increasing use of electrical utilization devices such as toasters, washers, mixers, fry pans, coffee makers, saws, drills, lawn mowers and devices using electrical motors, there has been a corresponding increase in the possibility of an electrical insulation breakdown with the chance that an operator might be electrocuted. In an effort to preclude this possibility the electrical codes has required that electrical outlets be grounded and also that the metal boxes for the electrical receptacles be grounded. This is required by many electrical codes for power sources of one hundred and ten to one hundred and twenty (110–120) volts. In modern construction the codes have generally demanded that the outlet receptacle be grounded. In addition, the codes are demanding that the outlet box for the outlet receptacle be grounded. One way of assuring that the outlet box is grounded is to electrically connect by means of a wire or other mechanical means the outlet receptacle to the outlet box. Now, assume that the outlet box is grounded by various means such as being in physical contact with the surrounding supporting structure or by an armored cable connecting with the outlet box. However, today the many codes demand that the outlet box be positively grounded with respect to a grounded outlet receptacle. It is necessary to electrically connect by means of a conductor the outlet box with the outlet receptacle. One way of doing this is for a worker to electrically connect to the outlet receptacle a conductor and then to electrically connect said conductor to the outlet box. This is time consuming and means that the worker must take valuable time on the construction job to perform a menial task which may due to poor workmanship not give an assured ground between the outlet receptacle and the outlet box. With this background and having worked for a number of years in the electrical industry I have invented a grounded electrical receptacle and an object of this invention is to provide such a receptacle having greater safety as there is assured a positive electrical connection between the grounded receptacle and the receptacle box; to provide a grounded receptacle which is easier to connect to the receptacle box; to provide a grounded receptacle which requires less time to install than previously available receptacles; to provide a grounded receptacle which is less expensive to install than previously available receptacles; to provide a grounded receptacle which requires less work to install than previously available receptacles; to provide a grounded receptacle which assures greater output per worker than previously available receptacles; to provide a grounded receptacle which assures a more reliable ground continuity between the receptacle and the receptacle box; to provide a grounded receptacle which eliminates the shock hazard; and, to provide a positive ground path which cannot jar loose or be easily disconnected between the grounded receptacle and the receptacle box.

These and other important objects and advantages of the invention will be more particularly brought forth upon reference to the accompanying drawings, the detailed specification of the invention and the appended claim.

In the drawings:

FIG. 1 is a front view illustrating a grounded receptacle constructed in accordance with the preferred teachings of this invention;

FIG. 2 is a side view illustrating said grounded receptacle;

FIG. 3 is a rear view illustrating said grounded receptacle;

FIG. 4 is a plan view looking down on grounding spade terminal;

FIG. 5 is a side elevational view looking at said grounding spade terminal;

FIG. 6 is a plan view looking down on a clip; and

FIG. 7 is a side elevational view looking at said clip.

In the drawings it is seen that there is a duplex electrical receptacle 10. The duplex electrical receptacle 10 has a base 12 and a face 14. The base 12 is of a dielectric material such as a plastic, a phenol-formaldehyde plastic or a melamine plastic. The face 14 may be of a dielectric material such as a plastic such as phenol-formaldehyde plastic or a melamine plastic. The face comprises in each outlet a set of female member 16, a female member 18 and a female member 20. There are two sets of these outlets. There is an electrical contact or contacts illustrated by screws 22. The screws 22 may connect with the line and also connect internally with the contact in the female member 16. There are two contacts 24 which are screws. These screws 24 connect internally with the electrical contact in the female member 18.

In FIGS. 2 and 3 it is seen that there is a continuous mounting yoke 26. The continuous mounting yoke 26 comprises a back member 28, side members 30 and front connecting or positioning members 32. In FIG. 2 it is seen that in the female member 20 that there is an electrical contact 34. The electrical contact 34 is a metal prong and connects with the continuous mounting yoke 26. There is an electrical contact 34 in each of the female members 20. The base 12 and the face 14 may be connected by means of a rivet 36 to make a unitary structure.

At the side of the continuous mounting yoke 26, near 30, there is attached a conductor 38. The conductor 38 terminates in an eyelet 40. A rivet 42 rivets the eyelet 40 to the side member 30 of the continuous mounting yoke 26.

The conductor 38 connects with a connecting member for connecting the grounded receptacle 10 to the outlet box. In FIGS. 4 and 5 it is seen that the carrier 38 connects with grounding spade terminal 44. The grounding spade terminal 44 may be positively attached to the receptacle box by means of a screw or bolt or a machine screw.

In FIGS. 6 and 7 it is seen that the carrier 38 connects with a clip 46 which has a base 48. The base 48 has an integral sleeve 50. The carrier 38 is positively positioned in the sleeve 50 either by soldering or a crimp fit or a press fit. The base 48 folds back on itself in a bend 51 to form a leaf 52. In the base 48 there are two inwardly directed fingers 54. Also, in the leaf 52 there are inwardly directed fingers 56. It is readily appreciated that the clip 46 may be pressed over the side or the end wall of the receptacle box so that the fingers 54 bite into the metal of the receptacle box to assure a positive electrical connection. Naturally, with the fingers directed in the manner they are directed it is difficult to pull or loosen the clip 46 from the wall of the receptacle box. Therefore, once the clip 46 is positively positioned on the wall of the receptacle box it is there to stay as only with great difficulty can the clip be removed from the receptacle box.

It is seen that with the grounding spade terminal 44 attached to the receptacle box or the clip 46 attached to the receptacle box that the continuous mouning yoke 26 and the receptacle box are at the same electrical potential and that the grounding electrode 34 and the female member 20 and the receptacle box are at the same electrical potention.

As is well known many electrical outlets use only two wires. A line wire connecting with the contacts 22 and a neutral wire connecting with the contacts 24. The receptacle box is grounded by tubing or conduit which leads back to the ground or distribution box. Then, to assure that the continuous mounting yoke 26 is at the same ground as the receptacle box the electrical conductor 38 connects the outlet receptacle and the receptacle box. This is for a two-wire system consisting of a line and a neutral wire.

For a three-wire system, commonly referred to as Romex cable, the contacts 22 connect with the line side, the contacts 24 connect with the neutral side, and the ground in the Romex cable connects with the receptacle box. Then the receptacle box by means of the carrier connects with the continuous mounting yoke. In this manner, either for a two-wire system or for a three-wire system there is assured a positive electrical connection between the outlet receptacle and the receptacle box.

From the foregoing it is seen that the conductor 38 is positively connected to the continuous mounting yoke 26 and also to the ground contact 34 in the female member 20. This is of importance as many electricians, especially, when in a hurry and being pressed to complete the job, may not positively connect, using the old-fashioned outlet receptacle, the conductor to the continuous mounting yoke. This means that the continuous mounting yoke and the receptacle box are not at the same electrical potential but are at different electrical potential and therefore electrically hazardous.

This ssytem of making integral the conductor 38 and the continuous mounting yoke 26 may be used on any outlet receptacle for positively assuring the outlet receptacle and the receptacle box to be at the same electrical potential and grounded.

From the foregoing it is seen that I have provided a means and a method for making integral the continuous mounting yoke, the grounding contact attached to the mounting yoke, the conductor leading from the mounting yoke to the receptacle box and the mounting box. Further, it is seen that I have provided this means and method which assures greater safety as there is a positive connection between the outlet receptacle and the receptacle box; which means and method requires less time to install a receptacle which is grounded to the receptacle box; which means and method means that it is less expensive to install an outlet receptacle which is electrically connected to the outlet box; which means and method assures less work required to install an outlet receptacle which is electrically connected to the receptacle box; which means and method eliminates a shock hazard as the outlet receptacle is positively connected to the receptacle box; which means and method provides a positive ground path which can not jar loose or easily be disconnected between the outlet receptacle and the receptacle box; which means and method provides a reliable ground continuity between the outlet receptacle and the receptacle box; and, which means and method makes possible a greater output per worker in the installation of the outlet receptacle.

In FIGS. 6 and 7 it is seen that there is a passageway 58 in the base 48 and the leaf 52. The passageway 58 is placed in the base 48 and the leaf 52 so that a machine screw may be screwed through the passageway into a tapped hole in the receptacle box between the continuous mounting yoke 26 and the receptacle box. In some installations it is required that the connector 38, in this instance the clip 46 as well, be attached to the receptacle box by means of a machine screw or a bolt.

Having presented my invention what I claim is:
1. An outlet receptacle, said receptacle comprising:
   (a) a first ground means comprising a mounting yoke;
   (b) a second means comprising an electrical conductor integral with said mounting yoke;
   (c) an attaching means comprising a grounding clip on said electrical conductor for attaching the conductor to an outlet receptacle box;
   (d) said grounding clip having a base;
   (e) said base folding back on itself to form a leaf; and,
   (f) said grounding clip having inwardly directed fingers to grip said outlet receptacle box.

References Cited

UNITED STATES PATENTS

| | | | |
|---|---|---|---|
| 1,791,264 | 2/1931 | Chaney et al. | 339—14 |
| 1,927,245 | 9/1933 | Russell | 339—14 |
| 2,574,330 | 11/1951 | Judd | 287—53 |
| 2,966,651 | 12/1960 | Von Holtz | 339—14 |
| 3,032,736 | 5/1962 | Howells | 339—14 |
| 3,034,084 | 5/1962 | Schmier et al. | 339—14 |
| 3,036,285 | 5/1962 | Smith | 339—14 |

FOREIGN PATENTS 357,101  11/1961  Switzerland.

MARVIN A. CHAMPION, Primary Examiner

P. A. CLIFFORD, Assistant Examiner

U.S. Cl. X.R.

339—164, 258